(12) United States Patent
Kimura

(10) Patent No.: US 9,534,936 B2
(45) Date of Patent: Jan. 3, 2017

(54) REFERENCE SIGNAL GENERATION APPARATUS AND REFERENCE SIGNAL GENERATION SYSTEM

(71) Applicant: MITUTOYO CORPORATION, Kanagawa (JP)

(72) Inventor: Akihide Kimura, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 135 days.

(21) Appl. No.: 14/270,778

(22) Filed: May 6, 2014

(65) Prior Publication Data

US 2014/0339405 A1    Nov. 20, 2014

(30) Foreign Application Priority Data

May 16, 2013   (JP) ................................ 2013-103901

(51) Int. Cl.
| | | |
|---|---|---|
| *G01D 5/347* | (2006.01) | |
| *G01D 5/244* | (2006.01) | |
| *G01D 5/36* | (2006.01) | |
| *G01D 5/38* | (2006.01) | |

(52) U.S. Cl.
CPC ...... *G01D 5/34715* (2013.01); *G01D 5/24438* (2013.01); *G01D 5/366* (2013.01); *G01D 5/38* (2013.01)

(58) Field of Classification Search
CPC  G01D 5/34715; G01D 5/24438; G01D 5/366; G01D 5/38
USPC ...................................................... 250/231.1
See application file for complete search history.

(56) References Cited

U.S. PATENT DOCUMENTS

| | | |
|---|---|---|
| 6,674,066 B1 | 1/2004 | Kaneda et al. |
| 2009/0064524 A1 | 3/2009 | Howley |

FOREIGN PATENT DOCUMENTS

| | | |
|---|---|---|
| JP | 10-332431 | 12/1998 |
| JP | 2000-304574 | 11/2000 |
| JP | 2006-329652 | 12/2006 |
| JP | 2009-515182 | 4/2009 |

OTHER PUBLICATIONS

U.S. Appl. No. 14/270,721 to Akihide Kimura, which was filed May 6, 2014.

*Primary Examiner* — Renee Chavez
(74) *Attorney, Agent, or Firm* — Greenblum & Bernstein, P.L.C.

(57) ABSTRACT

A reference signal generation circuit generates a reference signal from a reading result of the reference point detection pattern. The first light-receiving element array includes a first light-receiving element that outputs a first signal, and a second light-receiving element that is disposed in a first direction of the first light-receiving element and outputs a second signal. A second light-receiving element array includes a third light-receiving element that outputs a third signal, and a fourth light-receiving element that is disposed in the first direction of the third light-receiving element and outputs a fourth signal. The second light-receiving element array is disposed in a second direction of the first light-receiving element array. The reference signal generation circuit outputs a reference signal that starts at a period when levels of the first and second signal become equal and ends at a period when levels of the third and fourth signal become equal.

6 Claims, 13 Drawing Sheets

REFERENCE SIGNAL GENERATION APPARATUS AND REFERENCE SIGNAL GENERATION SYSTEM

INCORPORATION BY REFERENCE

This application is based upon and claims the benefit of priority from Japanese patent application No. 2013-103901, filed on May 16, 2013, the disclosure of which is incorporated herein in its entirety by reference.

BACKGROUND OF THE INVENTION

1. Field of the Invention

The present invention relates to a reference signal generation apparatus and a reference signal generation system.

2. Description of Related Art

Optical encoders are widely used to detect a position of a measurement device and the like. In an incremental encoder, a scale for detecting a relative position and a scale for detecting a reference position are provided. The incremental encoder reads the scale for detecting a reference position so as to convert detected relative position information into absolute position information. Therefore, the incremental encoder is required to detect a reference position with high accuracy.

To detect a reference position, there is a known method in which a plurality of light-receiving elements are arranged separately from each other in a reading direction of a reference point detection pattern, and a difference signal between the light-receiving elements is generated. By detecting a point where the difference signal crosses over a zero level (an intersection point), it is possible to identify a position of the reference point detection pattern in the reading direction (e.g., Japanese Unexamined Patent Application Publication No. 10-332431).

As another example of detecting an intersection point, there is a proposed method of correcting a shift in the intersection point pattern using a result of reading a pattern finer than the reference point detection pattern (Japanese Patent Translation Publication No. 2009-515182).

Further, there is another proposed method in which a plurality of light-receiving elements having a small width in the reading direction are arranged in the reading direction, and a logical AND of a difference signal between two adjacent light-receiving elements is obtained, thereby generating a reference signal with a small width (Japanese Unexamined Patent Application Publication No. 2006-329652).

Furthermore, there is another proposed method of providing a plurality of reference point detection patterns and generating a reference point by a difference in timings of reading the respective patterns (Japanese Unexamined Patent Application Publication No. 2000-304574).

SUMMARY OF THE INVENTION

However, the inventor has found out the following problems in the above-mentioned methods. In Japanese Unexamined Patent Application Publication No. 10-332431, a reference signal is generated based on one edge of the reference point detection pattern that has been read. Therefore, the edge to be a base changes according to the reading direction, and thus the timing of the reference signal changes. Accordingly, this method is unfavorable in principle in terms of improving the accuracy of a reference signal. Although Japanese Patent Translation Publication No. 2009-515182 can correct the position of a reference signal, it is necessary to perform a correction operation in advance. This will become a constraint in an operation of an encoder.

Although Japanese Unexamined Patent Application Publication No. 2006-329652 can avoid the above problem, the accuracy of the reference signal is determined by a size of the light-receiving element in the reading direction, especially by a width of the light-receiving element itself and a gap between the light-receiving elements. However, as there is a limitation in the miniaturization of the light-receiving element due to a restriction of a manufacturing process, an improvement of a reference signal is also limited.

Although Japanese Unexamined Patent Application Publication No. 2000-304574 can expect to generate a highly accurate reference signal, as the light-receiving elements receive light from the plurality of respective reference point detection patterns, an optical system and the like is required. Therefore, components unnecessary in a normal encoder are added, making the configuration complicated. Further, when the reference point detection pattern is miniaturized to improve accuracy of a reference signal, a diffraction effect will become stronger and it is thus difficult to effectively read the reference point detection pattern.

The present invention is made in light of the above circumstances, and an object of the present invention is to generate a highly accurate reference signal with a simple configuration.

A first exemplary aspect of the present invention is a reference signal generation apparatus that includes: a reference point detection light-receiving unit that receives light from a reference point detection pattern, in which the light is emitted from a light source; and a reference signal generation circuit that generates a reference signal from a reading result of the reference point detection pattern read by the reference point detection light-receiving unit. The reference point detection light-receiving unit includes: a unit light-receiving region including a first light-receiving element array and a second light-receiving element array. The first light-receiving element array includes: a first light-receiving element that outputs the reading result of the reference point detection pattern as a first signal; and a second light-receiving element that is disposed in a first direction and outputs the reading result of the reference point detection pattern as a second signal, in which the first direction is a reading direction of the reference point detection pattern for the first light-receiving element. The second light-receiving element array includes: a third light-receiving element that outputs the reading result of the reference point detection pattern as a third signal; and a fourth light-receiving element that is disposed in the first direction for the third light-receiving element and outputs the reading result of the reference point detection pattern as a fourth signal. The second light-receiving element array is disposed in a second direction for the first light-receiving element array and disposed with an offset in the first direction for the first light-receiving element array, in which the second direction is orthogonal to the first direction. The reference signal generation circuit outputs the reference signal that starts at a period where levels of the first signal and the second signal become equal and ends at a period where levels of the third signal and the fourth signal become equal. Thus, it is possible to generate the reference signal with a width determined by the offset. It is therefore possible to generate a highly accurate reference signal with a constant width without being subjected to a restriction of a manufacturing process of a light-receiving element.

A second exemplary aspect of the present invention is the above-mentioned reference signal generation apparatus, in which the reference point detection light-receiving unit includes a plurality of the unit light-receiving regions that are aligned in the second direction. Thus, it is possible to reduce a fluctuation in the reference signal when a light spot irradiated on the reference point detection light-receiving unit rotates.

A third exemplary aspect of the present invention is the above-mentioned reference signal generation apparatus, in which the reference signal generation circuit outputs the reference signal that starts at a period when a value obtained by subtracting the second signal from the first signal becomes a predetermined value and ends at a period when a value obtained by subtracting the fourth signal from the third signal becomes the predetermined value. Thus, it is possible to generate the reference signal with a width determined by the offset. It is therefore possible to generate a highly accurate reference signal with a constant width without being subjected to a restriction of a manufacturing process of a light-receiving element.

A fourth exemplary aspect of the present invention is the above-mentioned reference signal generation apparatus, in which the reference signal generation circuit generates a first comparison signal indicating a result of a comparison between the signal obtained by subtracting the second signal from the first signal and a first fixed potential that indicates the predetermined value, generates a second comparison signal indicating a result of a comparison between the signal obtained by subtracting the fourth signal from the third signal and the first fixed potential, and outputs a signal indicating a logical AND between the first comparison signal and the second comparison signal as the reference signal. Thus, it is possible to generate the reference signal with a width determined by the offset. It is therefore possible to generate a highly accurate reference signal with a constant width without being subjected to a restriction of a manufacturing process of a light-receiving element.

A fifth exemplary aspect of the present invention is the above-mentioned reference signal generation apparatus, in which the reference signal generation circuit includes: a first subtracter that outputs a first difference signal that is obtained by subtracting the second signal from the first signal; a second subtracter that outputs a second difference signal that is obtained by subtracting the fourth signal from the third signal; a first comparator that outputs the first comparison signal that is a result of a comparison between the first difference signal and the first fixed potential; a second comparator that outputs the second comparison signal that is a result of a comparison between the second difference signal and the first fixed potential; and a first AND circuit that outputs the logical AND between the first comparison signal and the second comparison signal. Further, the logical AND between the first comparison signal and the second comparison signal is output as the reference signal. Thus, it is possible to generate the reference signal with a width determined by the offset. It is therefore possible to generate a highly accurate reference signal with a constant width without being subjected to a restriction of a manufacturing process of a light-receiving element.

A sixth exemplary aspect of the present invention is the above-mentioned reference signal generation apparatus, in which the reference signal generation circuit includes: a third subtracter that outputs a third difference signal that is obtained by subtracting the first fixed potential from a summed value of the first to the fourth signals; a third comparator that outputs a third comparison signal that is a result of a comparison between the third difference signal and a second fixed potential; and a second AND circuit that outputs a logical AND between the logical AND, which is between the first comparison signal and the second comparison signal, and the third comparison signal as the reference signal. Thus, it is possible to generate the reference signal with a width determined by the offset. It is therefore possible to generate a highly accurate reference signal with a constant width without being subjected to a restriction of a manufacturing process of a light-receiving element.

A seventh exemplary aspect of the present invention is the above-mentioned reference signal generation apparatus further including: a plurality of the reference point detection light-receiving units aligned in the first direction corresponding to a plurality of the respective reference point detection patterns aligned in the first direction, in which the first to fourth signals are output from the plurality of the respective reference point detection light-receiving units to the reference signal generation circuit. Thus, it is possible to reduce a fluctuation in a width of a highly accurate reference signal with a constant width even when a foreign object is attached to a part of the plurality of reference point detection light-receiving units or a part of the plurality of reference point detection patterns.

An eighth exemplary aspect of the present invention is an reference signal generation system that includes: a light source; a scale including a reference point detection pattern formed thereon that is illuminated by the light source; a reference point detection light-receiving unit that receives light from the reference point detection pattern, in which the light is emitted by the illumination; and a reference signal generation circuit that generates a reference signal from a reading result of the reference point detection pattern read by the reference point detection light-receiving unit. The reference point detection light-receiving unit includes: a unit light-receiving region including a first light-receiving element array and a second light-receiving element array. The first light-receiving element array includes: a first light-receiving element that outputs the reading result of the reference point detection pattern as a first signal; and a second light-receiving element that is disposed in a first direction and outputs the reading result of the reference point detection pattern as a second signal, in which the first direction is a reading direction of the reference point detection pattern for the first light-receiving element. The second light-receiving element array includes: a third light-receiving element that outputs the reading result of the reference point detection pattern as a third signal; and a fourth light-receiving element that is disposed in the first direction for the third light-receiving element and outputs the reading result of the reference point detection pattern as a fourth signal. The second light-receiving element array is disposed in a second direction for the first light-receiving element array and disposed with an offset in the first direction for the first light-receiving element array, the second direction being orthogonal to the first direction. The reference signal generation circuit outputs the reference signal that starts at a period where levels of the first signal and the second signal become equal and ends at a period where levels of the third signal and the fourth signal become equal. Thus, it is possible to generate the reference signal with a width determined by the offset. It is therefore possible to generate a highly accurate reference signal with a constant width without being subjected to a restriction of a manufacturing process of a light-receiving element.

According to the present invention, it is possible to generate a reference signal highly accurately with a simple configuration.

The above-mentioned object and other objects, features, and advantages of the present invention shall be completely understood by the following Detailed Description and attached drawings. The attached drawings are illustrated only for graphical explanation and do not limit the present invention.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Figure 1:
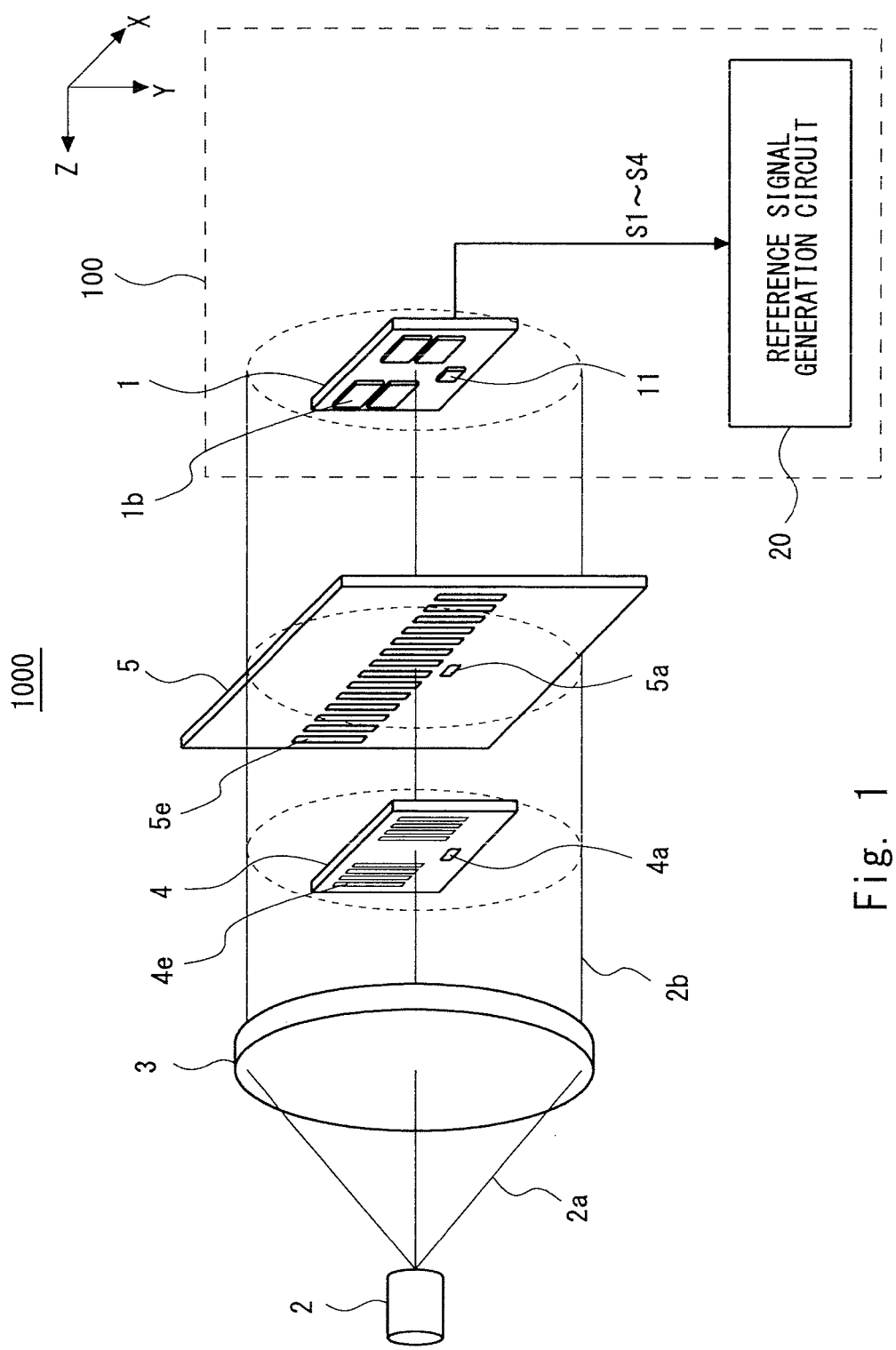
FIG. 1 is a perspective diagram schematically showing a configuration of an encoder 1000, which is an example of an encoder incorporating a reference signal generation apparatus 100 according to a first exemplary embodiment.

Hereinafter, exemplary embodiments of the present invention shall be explained with reference to the drawings. The same elements are denoted by the same reference numerals throughout the drawings, and a repeated explanation shall be omitted as necessary.

First Exemplary Embodiment

Firstly, a reference signal generation apparatus 100 according to a first exemplary embodiment shall be explained. A reference signal generation apparatus 100 is used to determine a reference position of an incremental encoder that is used to determine a position of a measurement device and the like. In order for easier understanding of a usage pattern of the reference signal generation apparatus 100, an example of an encoder incorporating the reference signal generation apparatus 100 shall be explained first. Note that as the encoder explained below incorporates a reference signal generation apparatus that generates a reference signal, the encoder may be understood as one aspect of a reference signal generation system in a broad sense.

FIG. 1 is a perspective diagram schematically showing a configuration of an encoder 1000, which is an example of an encoder incorporating the reference signal generation apparatus 100 according to the first exemplary embodiment. The encoder 1000 includes the reference signal generation apparatus 100, a light source 2, an optical element 3, an index scale 4, and a scale 5. The light source 2 is, for example, an LED (Light Emitting Diode) and emits light on the index scale 4 and the scale 5. The optical element 3 is, for example, a collimator that converts light 2a from the light source 2 into parallel light 2b. The index scale 4 and the scale 5 are arranged in order on an optical axis (a Z direction) of the parallel light 2b.

A reference point detection pattern 4a and a position detection pattern 4e are formed on the index scale 4. The reference point detection pattern 4a and the position detection pattern 4e are formed as slits perforated on a plate-like member. A reference point detection pattern 5a and a position detection pattern 5e are formed on the scale 5. The reference point detection pattern 5a and the position detection pattern 5e are formed as slits perforated on a plate-like member. Note that the index scale 4 and the scale 5 may be regarded as being an integrated component that is a scale on which the reference point detection pattern is formed.

The reference signal generation apparatus 100 is configured as an apparatus to read the reference point detection pattern 5a that is irradiated by light emitted from the light source 2 and generate a reference signal. As the reference point detection pattern 5a is a slit, a contrast of the reference point detection pattern 5a is different from surroundings of the reference point detection pattern 5a by the irradiated light. Accordingly, the reference signal generation apparatus 100 recognizes the reference point detection pattern 5a as a bright pattern.

The reference signal generation apparatus 100 includes a light-receiving unit 1 and a reference signal generation circuit 20. The light-receiving unit 1 includes a position detection light-receiving unit 1b and a reference point detection light-receiving unit 11. The position detection light-receiving unit 1b reads a pattern of the position detection pattern 5e that is irradiated by light transmitted through the position detection pattern 4e. The position detection light-receiving unit 1b outputs a signal indicating a read result to a position detection unit (not shown in the drawings). The position detection unit (not shown in the drawings) determines a detected position based on the received signal.

Figure 2:
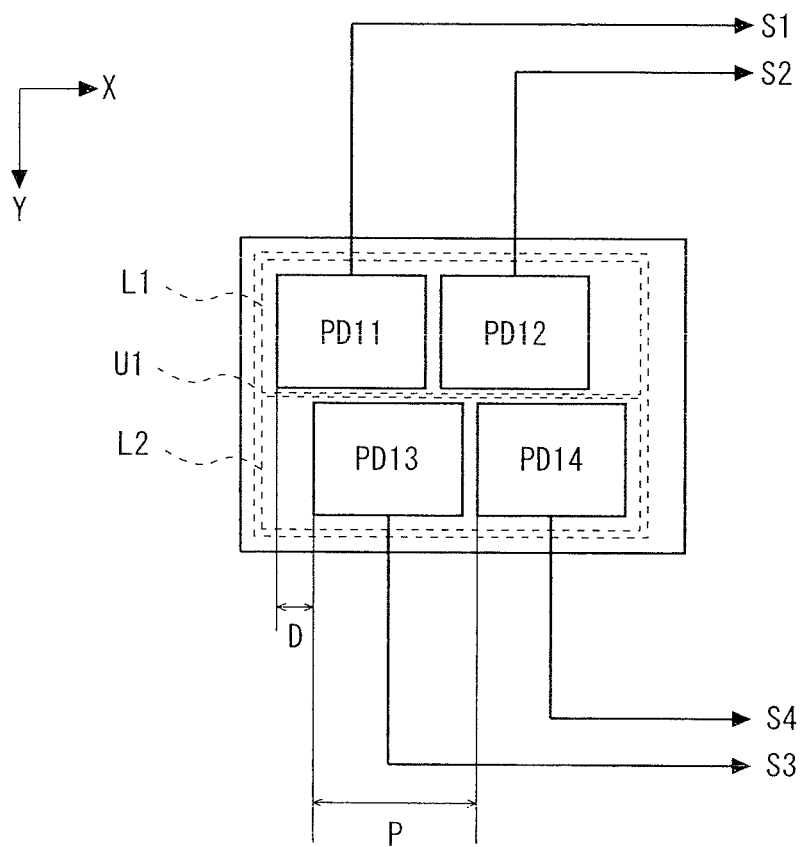
FIG. 2 is a top view schematically showing a configuration of a reference point detection light-receiving unit 11 according to the first exemplary embodiment.

FIG. 2 is a top view schematically showing a configuration of the reference point detection light-receiving unit 11 according to the first exemplary embodiment. The reference point detection light-receiving unit 11 includes a light-receiving element array, which is two light-receiving elements aligned in an X direction (also referred to as a first direction) that is the reading direction of the reference point detection pattern 5a. At least two light-receiving element arrays are aligned in a Y direction (also referred to as a second direction) that is vertical to the X direction, which is the reading direction of the reference point detection pattern 5a. These two light-receiving element arrays constitute one unit light-receiving region U1.

As shown in FIG. 2, the reference point detection light-receiving unit 11 includes light-receiving elements PD11 to PD14. The light-receiving elements PD11 and PD12 are aligned at a pitch P in the X direction and constitute one light-receiving element array L1. The light-receiving elements PD13 and PD14 are aligned at the pitch P in the X direction and constitute one light-receiving element array L2. As described above, the light-receiving element arrays L1 and L2 are aligned in the Y direction. Note that an end part of the light-receiving element array L2 in the X direction is disposed with an offset D from an end part of the light-receiving element array L1 in the X direction. Hereinafter, the light-receiving element arrays L1 and L2 are also referred to as a first and a second light-receiving element arrays, respectively. Further, a direction vertical to the X direction and the Y direction, i.e., a direction in which light from the optical element 3 propagates, shall be referred to as a Z direction. The light-receiving elements PD11 to PD14 are also referred to as first to fourth light-receiving elements, respectively.

In the reference point detection light-receiving unit 11, at the time of reading the reference point detection pattern 5a, firstly the light-receiving element PD11 starts reading the reference point detection pattern 5a, and slightly later, the light-receiving element PD13 starts reading the reference point detection pattern 5a. After that, the light-receiving element PD12 starts reading the reference point detection pattern 5a, and slightly later, the light-receiving element PD14 starts reading the reference point detection pattern 5a. The light-receiving elements PD11 to PD14 output brightness or darkness of the reference point detection pattern 5a that has been read as reading signals S1 to S4, respectively. Hereinafter, the reading signals S1 to S4 shall also be referred to as first to fourth signals, respectively.

Figure 3:
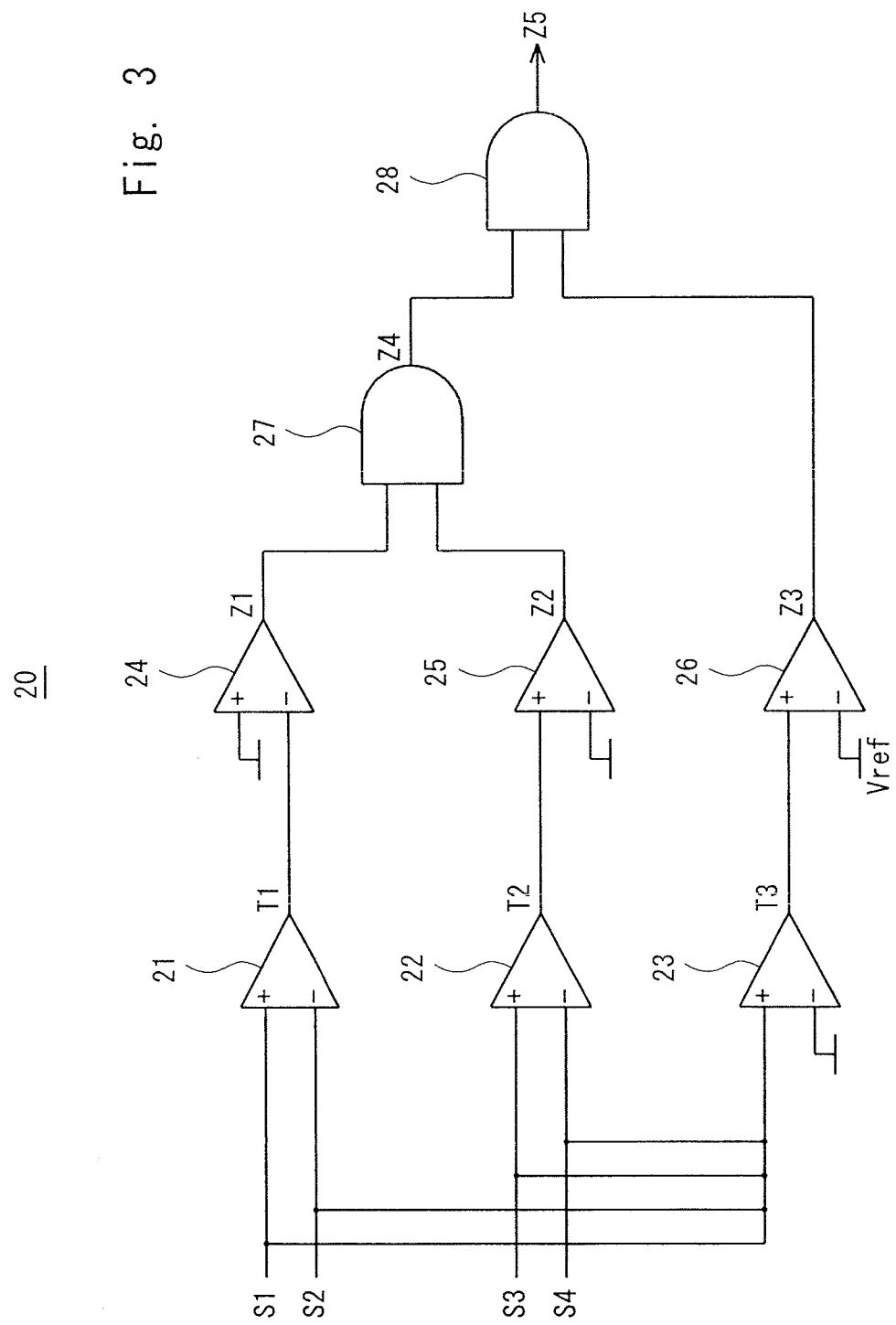
FIG. 3 is a circuit block diagram schematically showing a configuration of a reference signal generation circuit 20.

Next, a reference signal generation circuit 20 shall be explained. FIG. 3 is a circuit block diagram schematically showing a configuration of the reference signal generation circuit 20. The reference signal generation circuit 20 includes subtracters 21 to 23, comparators 24 to 26, and AND circuits 27 and 28. Hereinafter, the subtracters 21 to 23 shall also be referred to as first to third subtracters, respectively. The comparators 24 to 26 shall also be referred to as first to third comparators, respectively. The AND circuits 27 and 28 shall also be referred to as first and second AND circuits, respectively.

The subtracter 21 subtracts the reading signal S2 from the reading signal S1 and outputs a subtraction result as a difference signal T1. The subtracter 22 subtracts the reading signal S4 from the reading signal S3 and outputs a subtraction result as a difference signal T2. The subtracter 23 subtracts a ground potential (also referred to as a first fixed potential) from the reading signals S1 to S4 and outputs a subtraction result as a difference signal T3. That is, the subtracter 23 outputs a sum signal of the reading signals S1 to S4 as the difference signal T3. Hereinafter, the difference signals T1 to T3 shall also be referred to as first to third difference signals, respectively.

As for the comparator 24, the ground potential is input to a non-inverting input terminal, and the difference signal T1 is input to an inverting input terminal. The comparator 24 outputs a result of a comparison between the ground potential and the difference signal T1 as a signal Z1. As for the comparator 25, the difference signal T2 is input to a non-inverting input terminal, and the ground potential is input to an inverting input terminal. The comparator 25 outputs a result of a comparison between the difference signal T2 and the ground potential as a signal Z2. As for the comparator 26, the difference signal T3 is input to a non-inverting input terminal, and a reference potential Vref (also referred to as a second fixed potential) is input to an inverting input terminal. The comparator 26 outputs a result of a comparison between the difference signal T3 and the reference potential Vref as a signal Z3. Hereinafter, the signals Z1 to Z3 shall also be referred to first to third comparison signals, respectively.

The AND circuit 27 outputs a logical AND between the signals Z1 and Z2 as a pulse signal Z4. The AND circuit 28 outputs a logical AND between the signal Z3 and the pulse signal Z4 as a reference pulse signal Z5, which is a reference signal.

Figure 4:
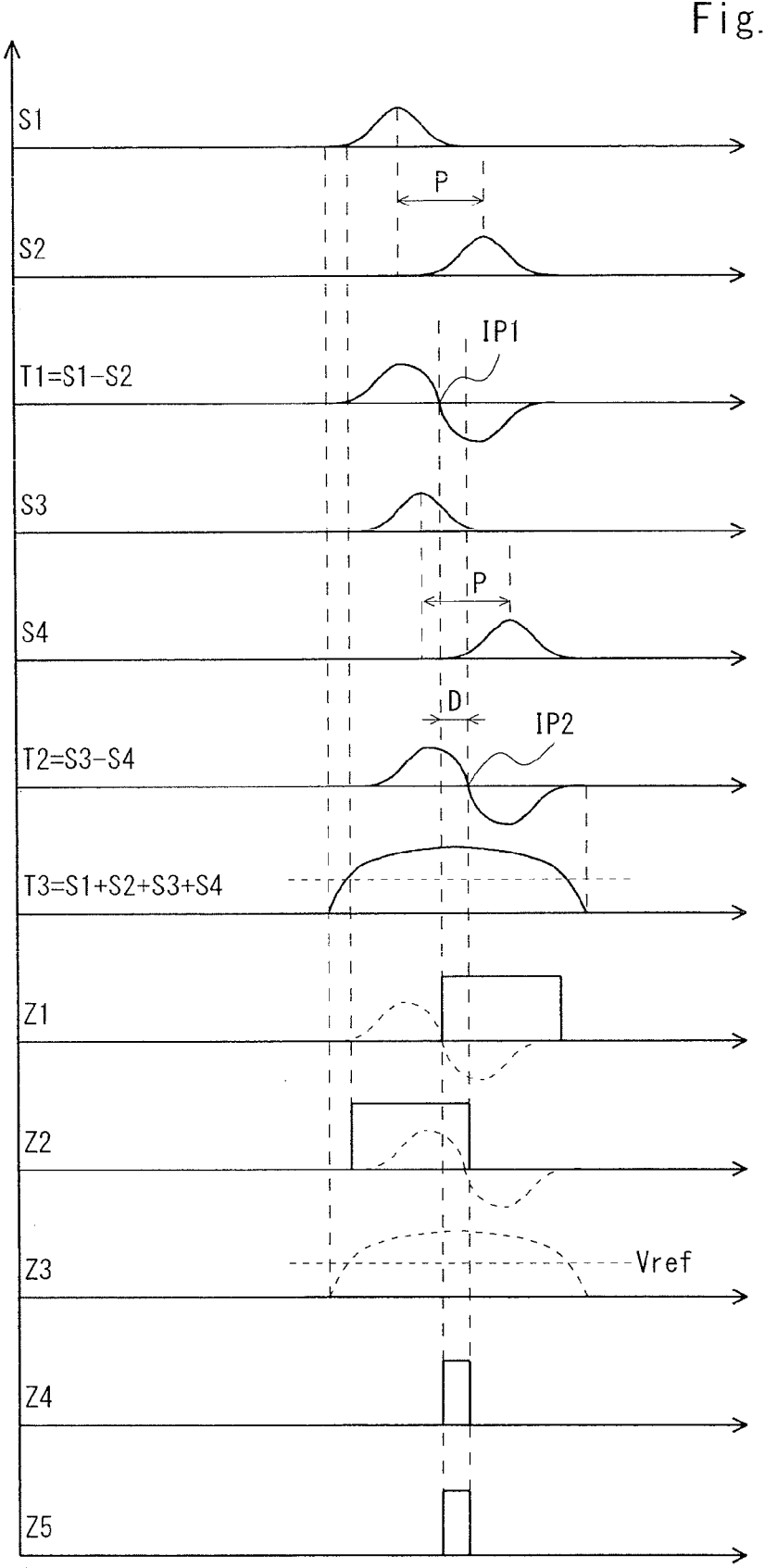
FIG. 4 is a timing chart showing an operation of the reference signal generation apparatus 100.

Next, a reference signal generation operation of the reference signal generation apparatus 100 shall be explained. FIG. 4 is a timing chart showing an operation of the reference signal generation apparatus 100. In the light-receiving element array L1, the light-receiving element PD11 reads the reference point detection pattern 5a, and after that, the light-receiving element PD12 reads the reference point detection pattern 5a. Then, a reading waveform is generated in the reading signal S1, and after that, a reading waveform is generated in the reading signal S2. As the subtracter 21 subtracts the reading signal S2 from the reading signal S1 by the above-mentioned configuration, an intersection point IP1 is generated in the difference signal T1 (S1-S2). The intersection point IP1 may be understood as being a point where a level of the reading signal S1 becomes equal to a level of the reading signal S2.

Further, in the light-receiving element array L2, the light-receiving element PD13 reads the reference point detection pattern 5a with a delay of an offset D from the light-receiving element PD11, and after that, with a delay of the offset D from the light-receiving element PD12, the light-receiving element PD14 reads the reference point detection pattern 5a. Then, a reading waveform is generated in the reading signal S3 with a delay of the offset D from the reading signal S1, and after that, with a delay of the offset D from the reading signal S2, a reading waveform is generated in the reading signal S4. As the subtracter 22 subtracts the reading signal S4 from the reading signal S3 by the above-mentioned configuration, an intersection point IP2 is generated in the difference signal T2 (S3-S4). That is, a timing of the intersection point IP2 is delayed by the offset D from the intersection point IP1. The intersection point IP2 may be understood as being a point where a level of the reading signal S3 becomes equal to a level of the reading signal S4.

The subtracter 23 outputs the difference signal T3, which is a sum signal of the reading signals S1 to S4, as described above.

The comparator 24 compares the ground potential with the difference signal T1 by the above-mentioned configuration. As a result, the signal Z1 that is output from the comparator 24 becomes HIGH in a period where the difference signal T1, which starts at the intersection point IP1, is in a period of a negative potential.

The comparator 25 compares the signal Z2 with the ground potential by the above-mentioned configuration. As a result, the signal Z2 that is output from the comparator 25 becomes HIGH in a period where the difference signal T2, which ends at the intersection point IP2, is in a period of a positive potential.

The comparator 26 compares the signal Z3 with the reference potential. As a result, the signal Z3 that is output from the comparator 26 becomes HIGH in the period where Z3≥Vref.

The AND circuit 27 outputs a logical AND between the signal Z1 and the signal Z2 as the pulse signal Z4. That is, the pulse signal Z4 is a pulse signal that starts at the intersection point IP1 and ends at the intersection point IP2.

The AND circuit 28 outputs a logical AND between the signal Z3 and the pulse signal Z4 as the reference pulse signal Z5. In this case, the pulse signal Z4 is output as-is, as the reference pulse signal Z5.

As described above, in this configuration, the two light-receiving element arrays L1 and L2 generate two intersection points IP1 and IP2, timings of which differ from each other by the offset D between the light-receiving element arrays. Then, the reference pulse signal Z5 sandwiched between the intersection points IP1 and IP2 is generated. In this configuration, the timing of the intersection point IP1 is determined only by the arrangement of the light-receiving elements PD11 and PD12, while the timing of the intersection point IP2 is determined only by the arrangement of the light-receiving elements PD13 and PD14. Accordingly, a difference in the timings of the intersection points IP1 and IP2 is a constant value determined by the offset D. Thus, this configuration is capable of maintaining the pulse width of the reference pulse signal Z5, which is a reference signal, to be constant.

Further, in this configuration, the offset D can be determined only by the arrangement of the light-receiving element arrays. Accordingly, the offset D is not subjected to a restriction of a minimum feature size such as a manufacturing process of the light-receiving unit. Consequently, the value of the offset D can be determined freely according to a desired value of the pulse width of the reference pulse signal Z5.

Furthermore, in this configuration, it is possible to obtain a reference signal with a constant width without requiring special work on the side of the reference point detection 5a. Thus, in order to read a reference point detection pattern, it is not necessary to insert an optical system or the like between the reference point detection pattern and the light-receiving unit, thereby achieving a simple configuration.

Second Exemplary Embodiment

Figure 5:
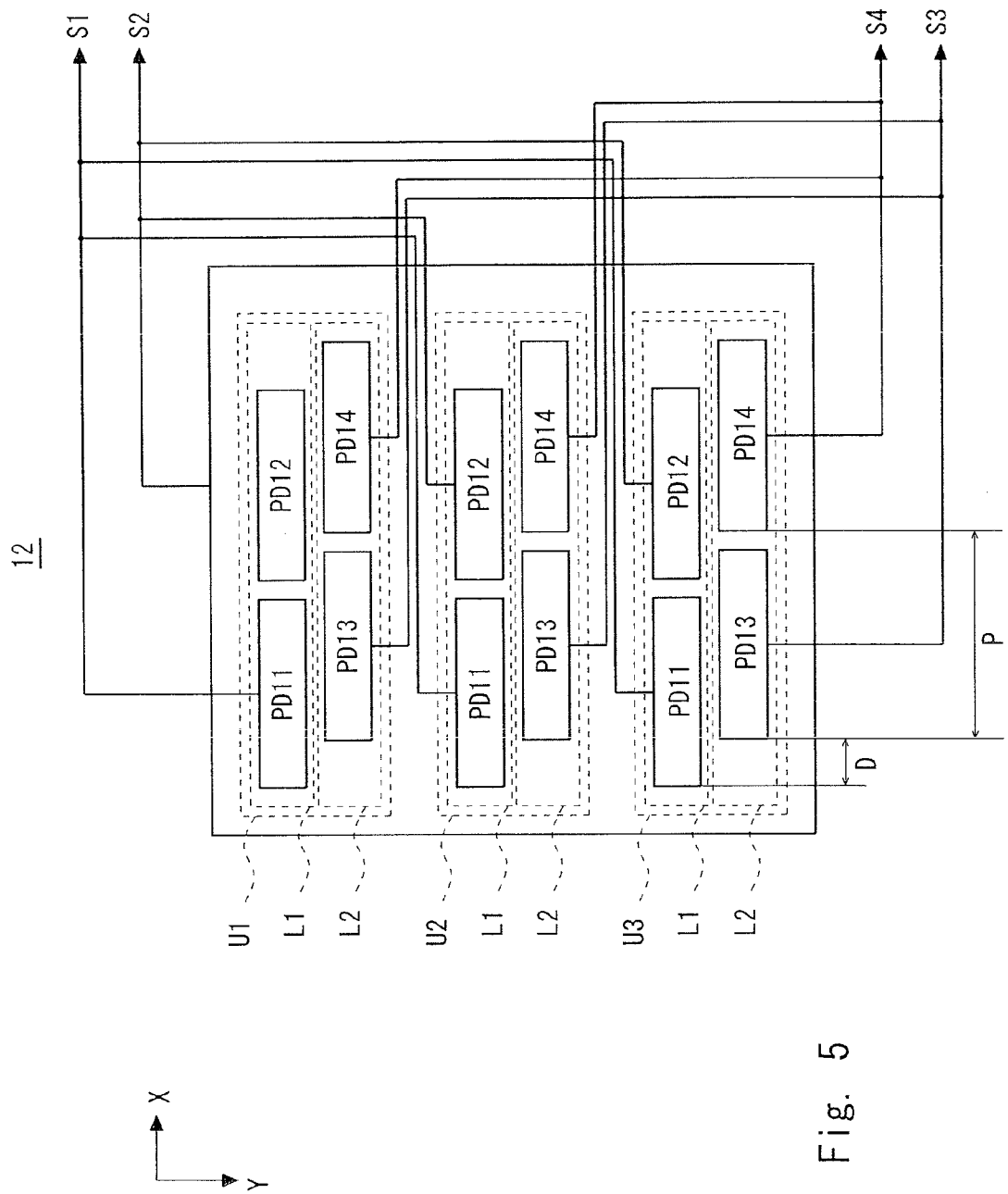
FIG. 5 is a top view schematically showing a configuration of a reference point detection light-receiving unit 12 according to a second exemplary embodiment.

Next, a reference signal generation apparatus 200 according to a second exemplary embodiment shall be explained. The reference signal generation apparatus 200 is a modified example of the reference signal generation apparatus 100 and is used to determine a reference position of an incremental encoder that is used to determine a position of a measurement device or the like. The reference signal generation apparatus 200 has the same configuration as that of the reference signal generation apparatus 100 except that the reference point detection light-receiving unit 11 in the reference signal generation apparatus 100 is replaced by a reference signal detection light-receiving unit 12. FIG. 5 is a top view schematically showing a configuration of the reference point detection light-receiving unit 12 according to the second exemplary embodiment.

The reference point detection light-receiving unit 12 includes unit light-receiving regions U1 to U3. The unit light-receiving regions U1 to U3 are aligned in the Y direction. The unit light-receiving region U1 has a configuration similar to that of unit light-receiving region in the first exemplary embodiment. Moreover, as the unit light-receiving regions U2 and U3 have a configuration similar to that of the unit light-receiving region U1, an explanation of the unit light-receiving regions U2 and U3 shall be omitted. As other configurations and a reference point generation operation of the reference signal generation apparatus 200 are similar to those of the reference signal generation apparatus 100, an explanation of the other configurations and the reference point generation operation of the reference signal generation apparatus 200 shall be omitted.

Figure 6:
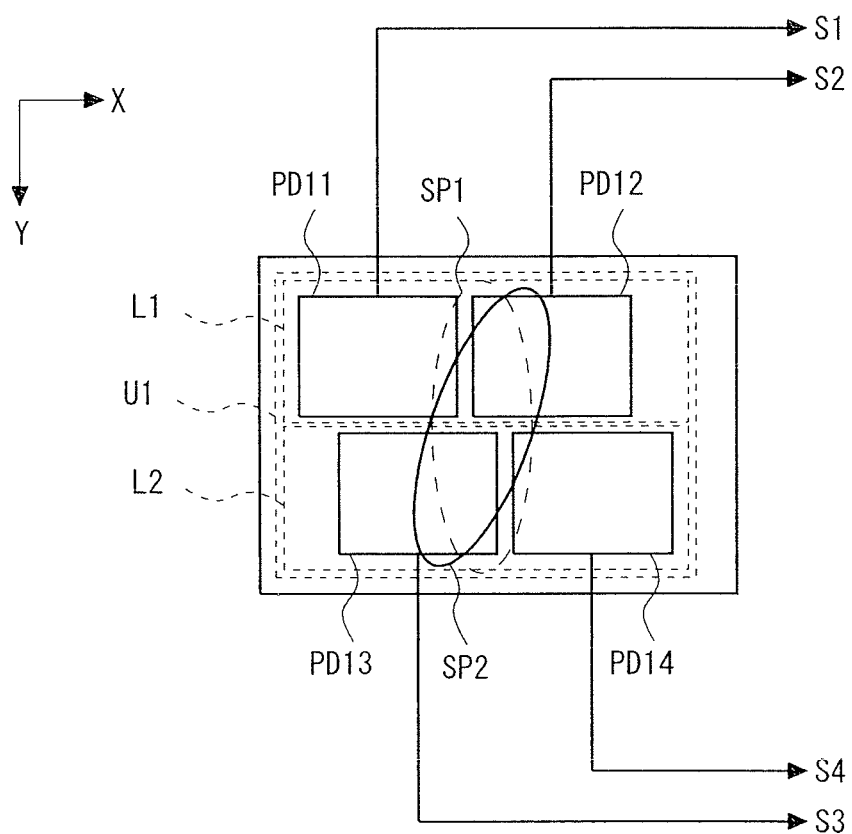
FIG. 6 is a top view showing a spot shape that is irradiated on a unit light-receiving region U1 of the reference point detection light-receiving unit 11 according to the first exemplary embodiment.

In the reference signal generation apparatus, a light spot irradiated on the light-receiving unit may rotate at the time of reading the reference point detection pattern 5a due to a manufacturing error or a disturbance and the like during operation. FIG. 6 is a top view showing a shape of the light spot that is irradiated on the unit light-receiving region U1 of the reference point detection light-receiving unit 11 according to the first exemplary embodiment. When the light spot does not rotate, the light spot will have a shape in which a long axis is along the Y direction, for example, like the spot SP1. Meanwhile, when the light spot rotates, the light spot will have a shape in which a long axis rotates clockwise, for example, like the spot SP2.

Figure 7:
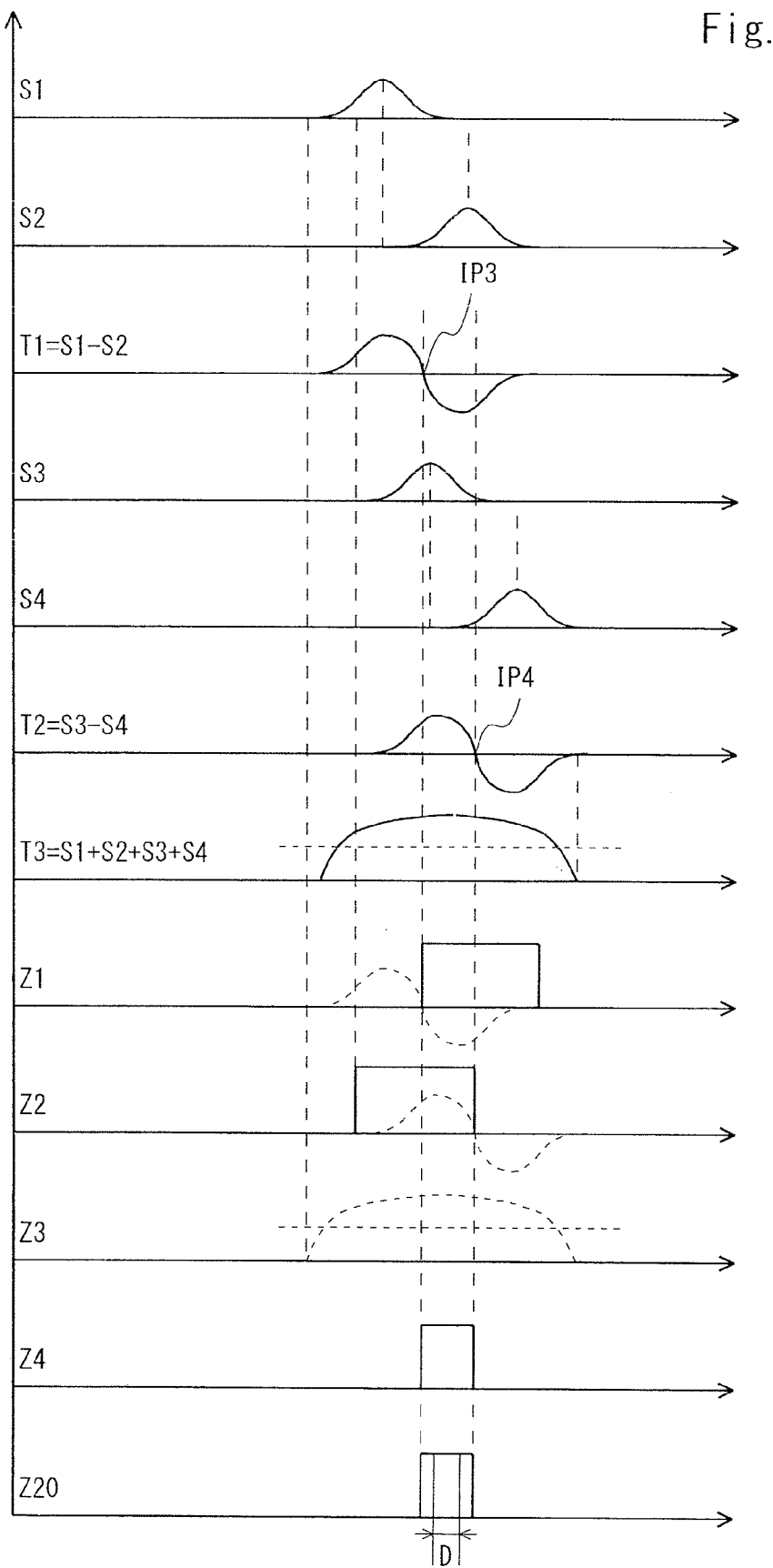
FIG. 7 is a timing chart showing a signal in the reference point detection light-receiving unit 11 when spots SP1 and SP2 are irradiated.

FIG. 7 is a timing chart showing a signal in the reference point detection light-receiving unit 11 when the spots SP1 and SP2 are emitted. When the light spot moves from left to right of the drawing, the light is irradiated on the light-receiving elements PD11 and PD12 by the spot SP2 faster than by the spot SP1, and the light is irradiated on the light-receiving elements PD13 and PD14 by the spot SP3 slower than by the spot SP1. Therefore, the intersection point IP3 when the spot SP2 is irradiated will have a timing faster than that of the intersection point IP1 when the spot SP1 is irradiated. Further, the intersection point IP4 when the spot SP2 is irradiated will have a timing slower than that of the intersection point IP2 when the spot SP1 is irradiated. Accordingly, a reference pulse signal Z20 that is generated based on the spot SP2 will have a pulse width wider than that of the reference pulse signal Z5 that is generated based on the spot SP1.

Figure 8:
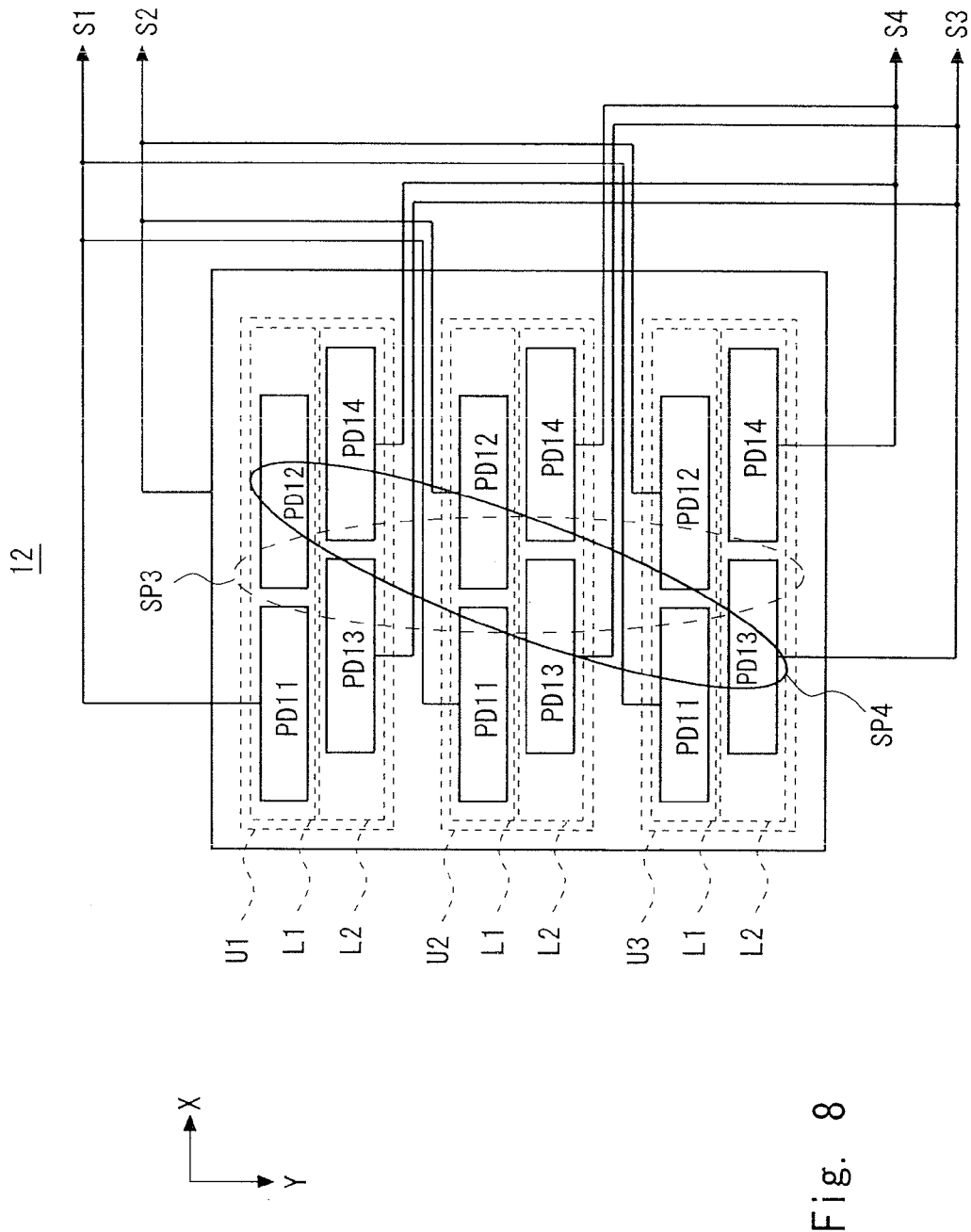
FIG. 8 is a top view showing a spot shape of light irradiated on the reference point detection light-receiving unit 12.

However, in this exemplary embodiment, as a plurality of unit light-receiving regions are disposed in the Y direction, it is possible to reduce a fluctuation in the width or the reference pulse signal that is caused by rotation of the light spot. FIG. 8 is a top view showing a shape of a light spot that is irradiated on the reference point detection light-receiving unit 12. When the light spot does not rotate, the light spot will have a shape in which a long axis is along the Y direction, for example, like the spot SP3. Meanwhile, when the light spot rotates, the light spot will have a shape in which a long axis rotates clockwise, for example, like the spot SP4.

In the reference point detection light-receiving unit 12, the unit light-receiving regions are aligned in a long-axis direction of the light spot (the Y direction). Therefore, even when the light spot rotates like the spot SP4, the light-receiving element outputs a signal at an early timing in the upper part of the spot SP4 in the Y direction, while the light-receiving element outputs a timing at a delayed timing in the lower part of the spot SP4 in the Y direction. Therefore, the reading signals S1 to S4, which are output respectively from the unit light-receiving regions of the upper part of the spot SP4 and from the unit light-receiving regions of the lower part of the spot SP4, are synthesized, and a difference between the timings of the difference signals T1 and T2 is cancelled out. Accordingly, according to this configuration, it is possible to maintain a width of a reference signal even when a light spot that is irradiated on the light-receiving unit rotates (yaws).

Although an example in which there are three unit light-receiving regions has been explained above, this is merely an example. The number of the unit light-receiving regions may be any plural number other than three.

Third Exemplary Embodiment

Figure 9:
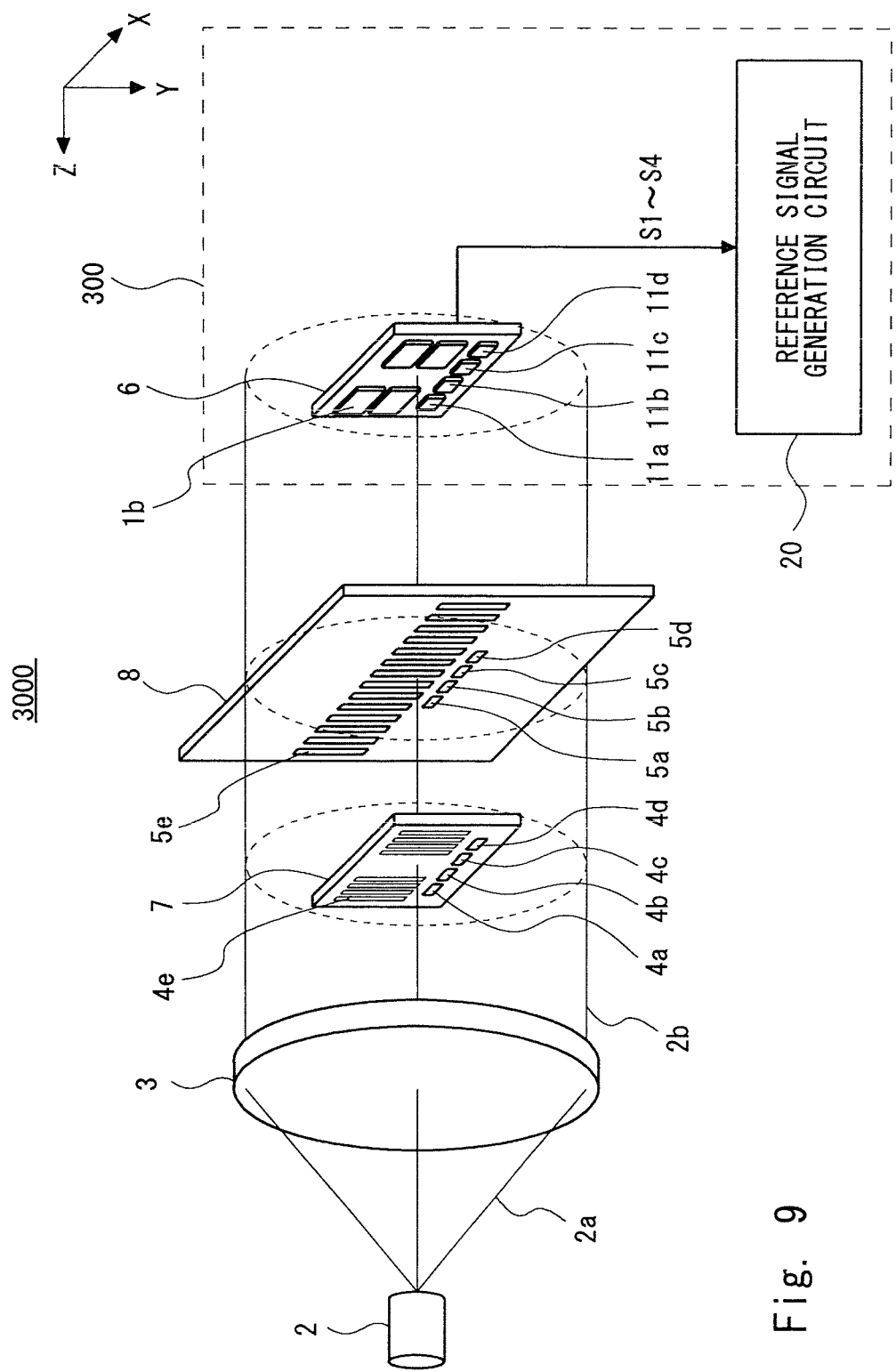
FIG. 9 is a perspective diagram schematically showing a configuration of an encoder 3000, which is an example of an encoder incorporating a reference signal generating apparatus 300 according to a third exemplary embodiment.

Next, a reference signal generation apparatus 300 according to a third exemplary embodiment shall be explained. The reference signal generation apparatus 300 is a modified example of the reference signal generation apparatus 100 and is used to determine a reference position of an incremental encoder that is used to determine a position of a measurement device or the like. FIG. 9 is a perspective diagram schematically showing a configuration of an encoder 3000, which is an example of an encoder incorporating the reference signal generation apparatus 300 according to the third exemplary embodiment. The encoder 3000 has the same configuration as that of the encoder 1000 except that the index scale 4, the scale 5, and the reference signal generation apparatus 100 in the encoder 1000 are replaced by an index scale 7, a scale 8, and the reference signal generation apparatus 300, respectively.

Reference point detection patterns 4a to 4d and a position detection pattern 4e that are aligned in the X direction are formed on the index scale 7. As the reference point detection patterns 4b to 4d are similar to the reference point detection pattern 4a, an explanation of the reference point detection patterns 4b to 4d shall be omitted. Reference point detection patterns 5a to 5d and a position detection pattern 5e that are aligned in the X direction are formed on the scale 8. The reference point detection patterns 5a to 5e are formed at the positions corresponding to the reference point detection patterns 4a to 4d, respectively. As the reference point detection patterns 5b to 5d are similar to the reference point detection pattern 5a, an explanation of the reference point detection patterns 5b to 5d shall be omitted.

Figure 10:
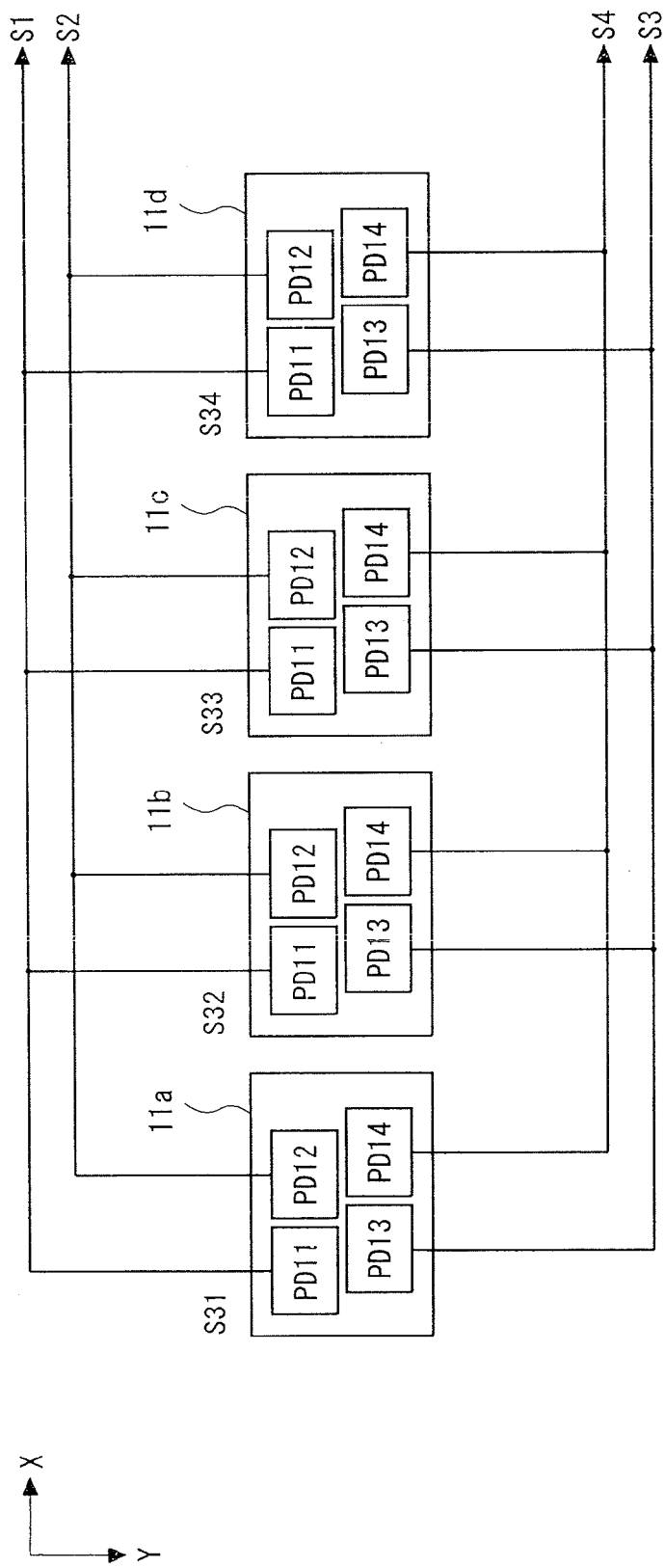
FIG. 10 is a top view schematically showing an arrangement of reference point detection light-receiving units 11a to 11d according to the third exemplary embodiment.

The reference signal generation apparatus 300 includes a light-receiving unit 6 and a reference signal generation circuit 20. The light-receiving unit 6 includes reference point detection light-receiving units 11a to 11d and a position detection light-receiving unit 1b. As the reference point detection light-receiving units 11b to 11d are similar to the reference point detection light-receiving unit 11a, an explanation of the reference point detection light-receiving units 11b to 11d shall be omitted. The reference point detection light-receiving units 11a to 11d are disposed at the positions corresponding to the reference point detection patterns 5a to 5d, respectively. FIG. 10 is a top view schematically showing an arrangement of the reference point detection light-receiving units 11a to 11d according to the third exemplary embodiment. The reference point detection light-receiving units 11a to 11d have a configuration similar to that of the reference point detection light-receiving unit 11 according to the first exemplary embodiment. The reference point detection light-receiving units 11a to 11d are aligned in the X direction, which is the reading direction. Further, the reference point detection patterns 4a to 4d and 5a to 5d are arranged to correspond to the reference point detection light-receiving units 11a to 11d, respectively.

Figure 11:
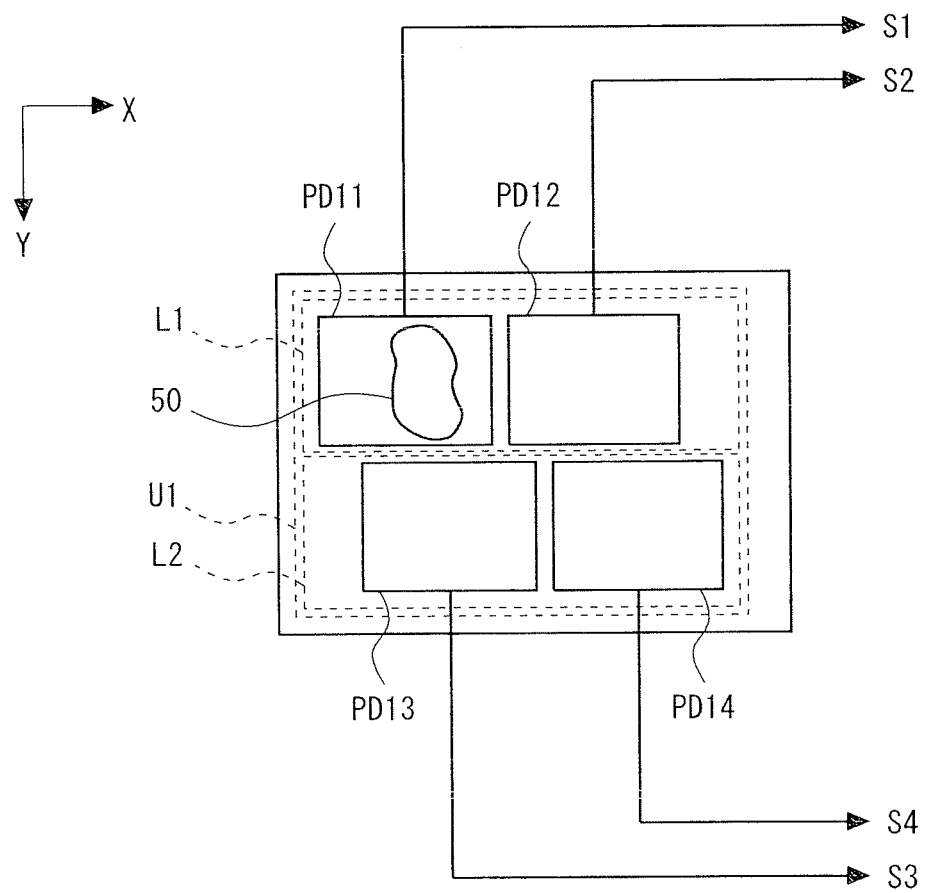
FIG. 11 is a top view showing a state where a foreign object is attached to a part of the reference point detection light-receiving unit 11 according to the first exemplary embodiment.
Figure 12:
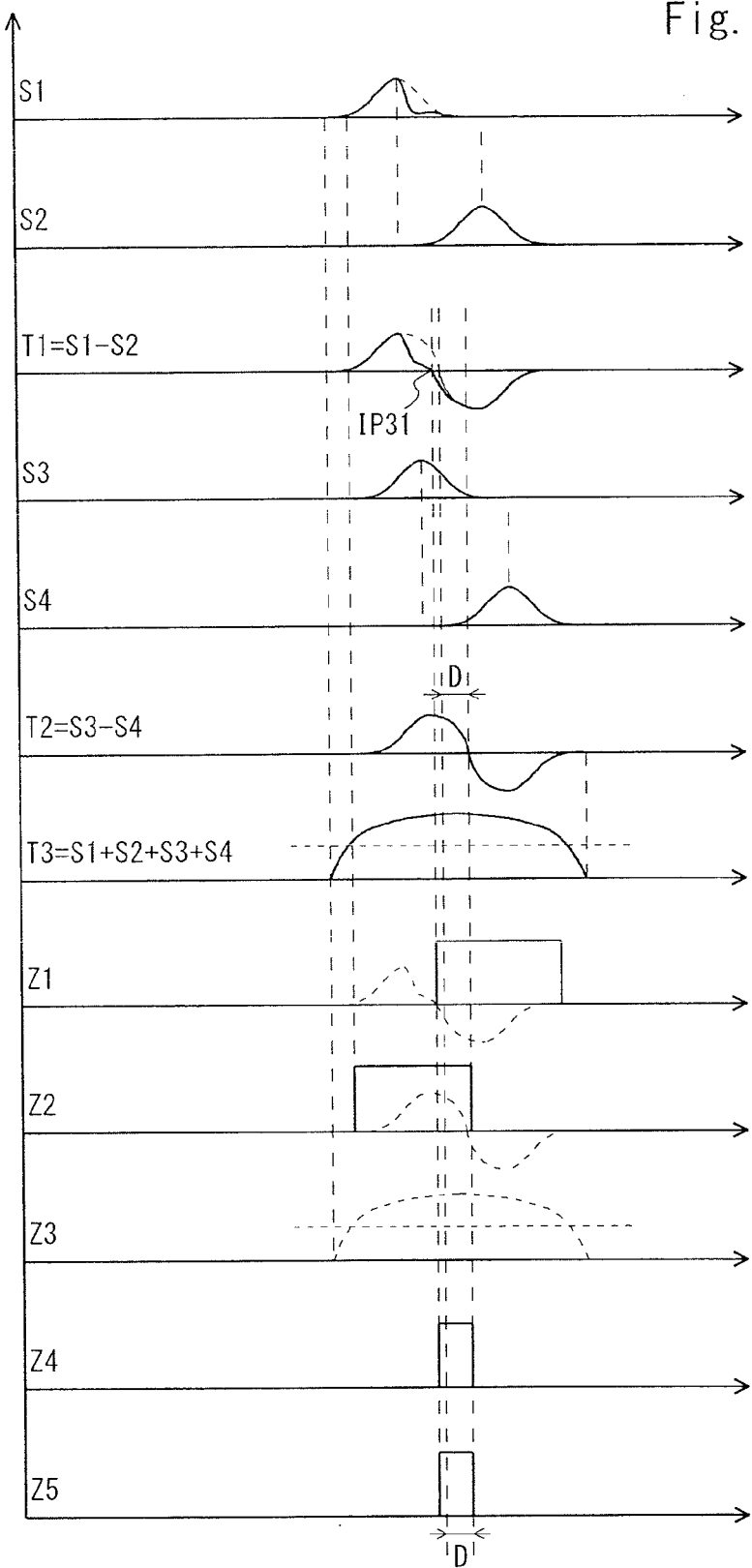
FIG. 12 is a timing chart showing a signal when a foreign object is attached to a part of the reference point detection light-receiving unit 11 according to the first exemplary embodiment.

In order to understand advantages of the reference signal generation apparatus 300 according to this exemplary embodiment, an influence when a foreign object is attached to the reference point detection light-receiving unit 11 of the reference signal generation apparatus 100 shall be explained. FIG. 11 is a top view showing a state where a foreign object is attached to a part of the reference point detection light-receiving unit 11 according to the first exemplary embodiment. FIG. 12 is a timing chart showing a signal when a foreign object is attached to a part of the reference point detection light-receiving unit 11 according to the first exemplary embodiment. For example, when a foreign object 50 is attached to the light-receiving element PD11 of the reference point detection light-receiving unit 11, light that is supposed to be irradiated on the light-receiving element PD11 is shielded by the foreign object 50. As a result, as shown in FIG. 11, a waveform of the reading signal S1 is distorted, and a position of the intersection point moves from IP1 to IP31. Consequently, a width of a reference pulse signal fluctuates.

Figure 13:
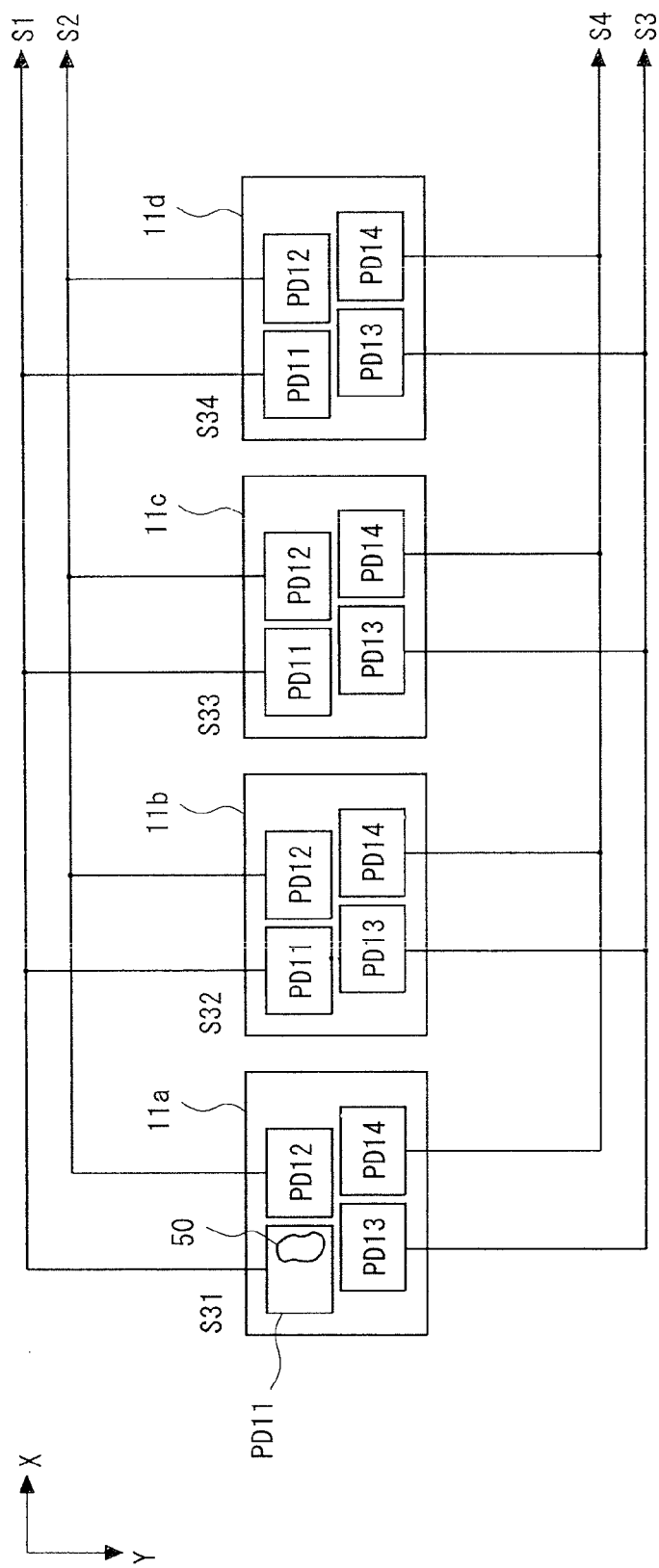
FIG. 13 is a top view showing the state where a foreign object is attached to a part of a reference point detection light-receiving unit 11a according to the third exemplary embodiment.

Meanwhile, in this configuration, as a plurality of light-receiving units are disposed in the X direction, which is the reading direction, it is possible to reduce the fluctuation in the width of the reference pulse signal that is caused by the foreign object that has been attached. FIG. 13 is a top view showing a state where a foreign object is attached to a part of the reference point detection light-receiving unit 11a according to the third exemplary embodiment. In this case, a signal S31 output from the reference point detection light-receiving unit 11a will have a distorted waveform in a manner similar to that of the reading signal S1 in FIG. 12, and a position of the intersection point moves. However, in this configuration, signals S31 to S31 that are output from the reference point detection light-receiving units 11a to 11a are summed to generate the reading signal S1. Accordingly, even when foreign objects are attached to a part of the plurality of reference point detection light-receiving units, a signal with a normal waveform is output from the reference point detection light-receiving unit to which no foreign object is attached. As a result, even when a foreign object is attached to the reference point detection light-receiving unit 11a, a distortion in the waveform of the reading signal S1 can be reduced. Consequently, it is possible to prevent the intersection point of the difference signal T1 from moving.

Therefore, according to this configuration, it is possible to reduce or prevent a fluctuation in a width of a reference pulse signal even when a foreign object is attached to a light-receiving unit.

Note that although a case where a foreign object is attached to a light-receiving element has been explained so far, this is merely an example. It is obvious that the above explanation applies to a case where a foreign object is attached to a reference point detection pattern of the index scale or the scale.

Further, although a case where the number of the reference point detection patterns and the reference point detection light-receiving units is four has been explained so far, this is merely an example. The number of the reference point detection patterns and the reference point detection light-receiving units may be any plural number other than four.

Other Exemplary Embodiment

Note that the present invention is not limited to the above exemplary embodiments, and modifications can be made as appropriate without departing from the scope of the present invention. For example, the above reference signal generation circuit is merely an example. That is, as long as a reference signal similar to the one generated by the above reference signal generation circuit can be generated based on a signal from the reference point detection light-receiving unit, the configuration of the reference signal generation circuit may be changed as appropriate.

Although in the above-described third exemplary embodiment, a case where a plurality of reference point detection light-receiving units having a configuration similar to that of the reference point detection light-receiving unit 11 are aligned in the reading direction of the reference point detection pattern has been explained so far, this is merely an example. For example, a plurality of reference point detection light-receiving units having a configuration similar to that of the reference point detection light-receiving unit 12 may be aligned in the reading direction of the reference point detection pattern. In this case, not only an influence of attachment of a foreign object, but also an influence of rotation of the light spot that is irradiated on the reference point detection light-receiving unit may be reduced.

Although the above-described exemplary embodiments explained the light source 2 as being an LED, this is merely an example. The LED may be monochrome or white. Further, a laser diode or other laser devices may be used as the light source. Furthermore, a common broadband light source such as a halogen lamp may be used as the light source.

In the above-described exemplary embodiments, the light-receiving element array L and the light-receiving element array L2 of the reference point detection light-receiving unit 11 may be interchanged as appropriate. Moreover, the light-receiving element array L1 and the light-receiving element array L2 can be interchanged as appropriate in a part or all of the plurality of unit light-receiving regions of the reference point detection light-receiving unit 12.

Although a transmissive encoder has been explained in the above exemplary embodiments, this is merely an example. Therefore, the encoder according to the above exemplary embodiments may be a so-called reflective encoder in which light is reflected by a scale and the reflected light is received by a position detection light-receiving unit.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A reference signal generation apparatus comprising:
   a reference point detection light-receiver that receives light from a reference point detection pattern, the light being emitted from a light source; and
   a reference signal generation circuit that generates a reference signal from a reading result of the reference point detection pattern read by the reference point detection light-receiver, wherein
   the reference point detection light-receiver comprises:
   a unit light-receiving region including a first light-receiving element array and a second light-receiving element array,
   the first light-receiving element array comprises:
   a first light-receiving element that outputs the reading result of the reference point detection pattern as a first signal; and
   a second light-receiving element that is disposed in a first direction and outputs the reading result of the reference point detection pattern as a second signal, the first direction being a reading direction of the reference point detection pattern for the first light-receiving element,
   the second light-receiving element array comprises:
   a third light-receiving element that outputs the reading result of the reference point detection pattern as a third signal; and
   a fourth light-receiving element that is disposed in the first direction for the third light-receiving element and outputs the reading result of the reference point detection pattern as a fourth signal,
   the second light-receiving element array is disposed in a second direction for the first light-receiving element array and disposed with an offset in the first direction for the first light-receiving element array, the second direction being orthogonal to the first direction,
   the reference signal generation circuit outputs the reference signal that starts at a period where levels of the first signal and the second signal become equal and ends at a period where levels of the third signal and the fourth signal become equal,
   wherein the reference point detection light-receiver includes a plurality of the unit light-receiving regions that are aligned in the second direction,
   wherein the reference signal generation circuit outputs the reference signal that starts at a period when a value obtained by subtracting the second signal from the first signal becomes a predetermined value and ends at a period when a value obtained by subtracting the fourth signal from the third signal becomes the predetermined value,
   wherein the reference signal generation circuit
   generates a first comparison signal indicating a result of a comparison between the signal obtained by subtracting the second signal from the first signal and a first fixed potential that indicates the predetermined value,
   generates a second comparison signal indicating a result of a comparison between the signal obtained by subtracting the fourth signal from the third signal and the first fixed potential, and
   outputs a signal indicating a logical AND between the first comparison signal and the second comparison signal as the reference signal,
   wherein the reference signal generation circuit comprises:
   a first subtracter that outputs a first difference signal, the first difference signal being obtained by subtracting the second signal from the first signal;
   a second subtracter that outputs a second difference signal, the second difference signal being obtained by subtracting the fourth signal from the third signal;
   a first comparator that outputs the first comparison signal, the first comparison signal being a result of a comparison between the first difference signal and the first fixed potential;
   a second comparator that outputs the second comparison signal, the second comparison signal being a result of a comparison between the second difference signal and the first fixed potential; and a first AND circuit that outputs the logical AND between the first comparison signal and the second comparison signal, wherein the logical AND between the first comparison signal and the second comparison signal is output as the reference signal.

2. The reference signal generation apparatus according to claim 1, wherein the reference signal generation circuit comprises:
a third subtracter that outputs a third difference signal, the third difference signal being obtained by subtracting the first fixed potential from a summed value of the first to the fourth signals;
a third comparator that outputs a third comparison signal, the third comparison signal being a result of a comparison between the third difference signal and a second fixed potential; and
a second AND circuit that outputs a logical AND between the logical AND, which is between the first comparison signal and the second comparison signal, and the third comparison signal as the reference signal.

3. The reference signal generation apparatus according to claim 1, further comprising a position detection light-receiver that reads a pattern of a position detection pattern that is irradiated by the light from the light source, and outputs a signal indicating a read result to a position detector.

4. A reference signal generation apparatus comprising:
a reference point detection light-receiver that receives light from a reference point detection pattern, the light being emitted from a light source; and
a reference signal generation circuit that generates a reference signal from a reading result of the reference point detection pattern read by the reference point detection light-receiver, wherein
the reference point detection light-receiver comprises:
a unit light-receiving region including a first light-receiving element array and a second light-receiving element array,
the first light-receiving element array comprises:
a first light-receiving element that outputs the reading result of the reference point detection pattern as a first signal; and
a second light-receiving element that is disposed in a first direction and outputs the reading result of the reference point detection pattern as a second signal, the first direction being a reading direction of the reference point detection pattern for the first light-receiving element,
the second light-receiving element array comprises:
a third light-receiving element that outputs the reading result of the reference point detection pattern as a third signal; and
a fourth light-receiving element that is disposed in the first direction for the third light-receiving element and outputs the reading result of the reference point detection pattern as a fourth signal,
the second light-receiving element array is disposed in a second direction for the first light-receiving element array and disposed with an offset in the first direction for the first light-receiving element array, the second direction being orthogonal to the first direction,
the reference signal generation circuit outputs the reference signal that starts at a period where levels of the first signal and the second signal become equal and ends at a period where levels of the third signal and the fourth signal become equal, wherein the reference point detection light-receiver includes a plurality of the unit light-receiving regions that are aligned in the second direction, wherein a plurality of the reference point detection light-receivers are aligned in the first direction corresponding to a plurality of the respective reference point detection patterns aligned in the first direction, wherein the first to fourth signals are output from the plurality of the respective reference point detection light-receivers to the reference signal generation circuit.

5. A reference signal generation system comprising:
a light source;
a scale including a reference point detection pattern that is illuminated by the light source;
a reference point detection light-receiver that receives light from the reference point detection pattern, the light being emitted by the light source; and
a reference signal generation circuit that generates a reference signal from a reading result of the reference point detection pattern read by the reference point detection light-receiver, wherein
the reference point detection light-receiver comprises:
a unit light-receiving region including a first light-receiving element array and a second light-receiving element array,
the first light-receiving element array comprises:
a first light-receiving element that outputs the reading result of the reference point detection pattern as a first signal; and
a second light-receiving element that is disposed in a first direction and outputs the reading result of the reference point detection pattern as a second signal, the first direction being a reading direction of the reference point detection pattern for the first light-receiving element,
the second light-receiving element array comprises:
a third light-receiving element that outputs the reading result of the reference point detection pattern as a third signal; and
a fourth light-receiving element that is disposed in the first direction for the third light-receiving element and outputs the reading result of the reference point detection pattern as a fourth signal,
the second light-receiving element array is disposed in a second direction for the first light-receiving element array and disposed with an offset in the first direction for the first light-receiving element array, the second direction being orthogonal to the first direction,
the reference signal generation circuit outputs the reference signal that starts at a period where levels of the first signal and the second signal become equal and ends at a period where levels of the third signal and the fourth signal become equal, wherein the reference point detection light-receiver includes a plurality of the unit light-receiving regions that are aligned in the second direction, wherein the reference signal generation circuit outputs the reference signal that starts at a period when a value obtained by subtracting the second signal from the first signal becomes a predetermined value and ends at a period when a value obtained by subtracting the fourth signal from the third signal becomes the predetermined value, wherein the reference signal generation circuit
generates a first comparison signal indicating a result of a comparison between the signal obtained by subtracting the second signal from the first signal and a first fixed potential that indicates the predetermined value, generates a second comparison signal indicating a result of a comparison between the signal obtained by subtracting the fourth signal from the third signal and the first fixed potential, and outputs a signal indicating a logical AND between the first comparison signal and the second comparison signal as the reference signal, wherein the reference signal generation circuit comprises:
a first subtracter that outputs a first difference signal, the first difference signal being obtained by subtracting the second signal from the first signal;
a second subtracter that outputs a second difference signal, the second difference signal being obtained by subtracting the fourth signal from the third signal;
a first comparator that outputs the first comparison signal, the first comparison signal being a result of a comparison between the first difference signal and the first fixed potential;
a second comparator that outputs the second comparison signal, the second comparison signal being a result of a comparison between the second difference signal and the first fixed potential; and
a first AND circuit that outputs the logical AND between the first comparison signal and the second comparison signal, wherein the logical AND between the first comparison signal and the second comparison signal is output as the reference signal.

6. A reference signal generation system comprising:
a light source;
a scale including a reference point detection pattern that is illuminated by the light source;
a reference point detection light-receiver that receives light from the reference point detection pattern, the light being emitted by the light source; and
a reference signal generation circuit that generates a reference signal from a reading result of the reference point detection pattern read by the reference point detection light-receiver, wherein
the reference point detection light-receiver comprises:
a unit light-receiving region including a first light-receiving element array and a second light-receiving element array, the first light-receiving element array comprises:
a first light-receiving element that outputs the reading result of the reference point detection pattern as a first signal; and
a second light-receiving element that is disposed in a first direction and outputs the reading result of the reference point detection pattern as a second signal, the first direction being a reading direction of the reference point detection pattern for the first light-receiving element, the second light-receiving element array comprises:
a third light-receiving element that outputs the reading result of the reference point detection pattern as a third signal; and
a fourth light-receiving element that is disposed in the first direction for the third light-receiving element and outputs the reading result of the reference point detection pattern as a fourth signal, the second light-receiving element array is disposed in a second direction for the first light-receiving element array and disposed with an offset in the first direction for the first light-receiving element array, the second direction being orthogonal to the first direction, the reference signal generation circuit outputs the reference signal that starts at a period where levels of the first signal and the second signal become equal and ends at a period where levels of the third signal and the fourth signal become equal, wherein the reference point detection light-receiver includes a plurality of the unit light-receiving regions that are aligned in the second direction, wherein a plurality of the reference point detection light-receivers are aligned in the first direction corresponding to a plurality of the respective reference point detection patterns aligned in the first direction, wherein the first to fourth signals are output from the plurality of the respective reference point detection light-receivers to the reference signal generation circuit.

* * * * *